March 20, 1956     T. STAAF     2,739,016
AUTOMATIC BRAKE CONDITIONING MECHANISM
IN VEHICLES FOR LIQUID LOAD
Filed May 18, 1950
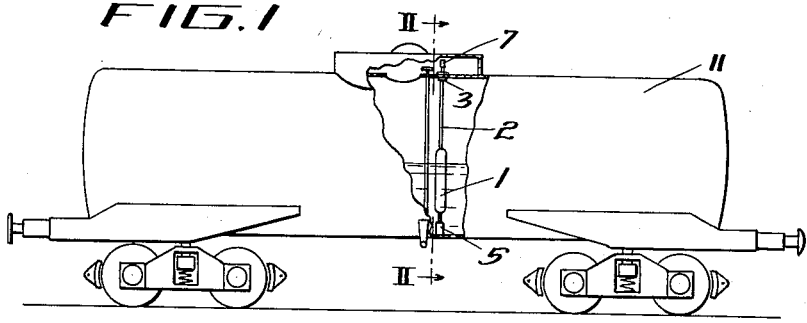
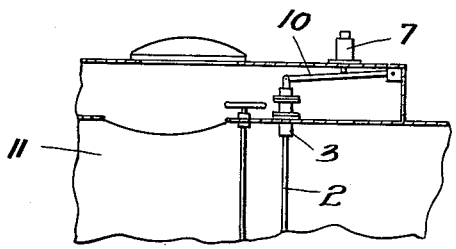
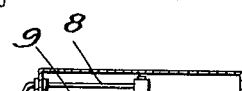
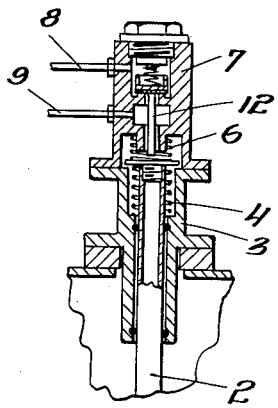
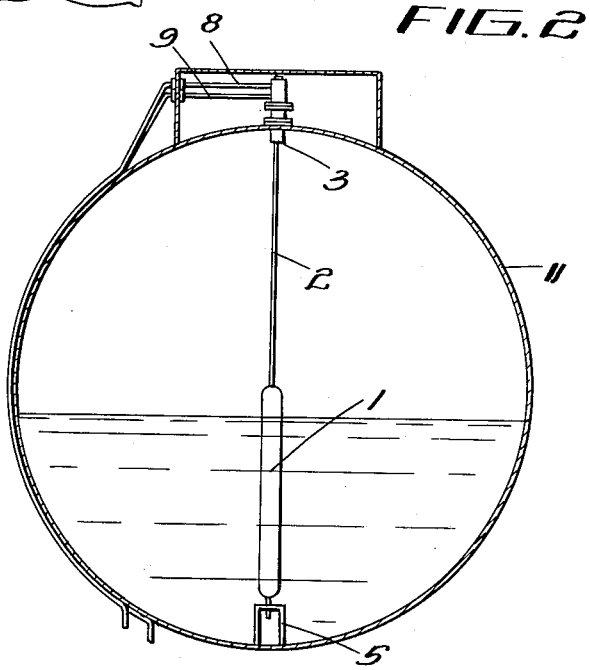
INVENTOR:
TORE STAAF
BY: Wenderoth, Lind & Ponack
ATTORNEYS United States Patent Office 2,739,016
Patented Mar. 20, 1956

2,739,016

AUTOMATIC BRAKE CONDITIONING MECHANISM IN VEHICLES FOR LIQUID LOAD

Tore Staaf, Traneberg, Sweden, assignor to Svenska Aktiebolaget Bromsregulator, Malmo, Sweden, a corporation of Sweden Application May 18, 1950, Serial No. 162,795

3 Claims. (Cl. 303—22)

This invention relates to railway and like vehicles, especially tank wagons and engine tenders, for liquid load, and with brakes capable of being conditioned for a lower or a higher braking effort, and more particularly, the invention relates to float-operated mechanism for the automatic conditioning of the brake of the vehicle for the lower or the higher braking effort according as the load of the vehicle is below or above a certain value.

In vehicles with liquid load, such as tank wagons and engine tenders, it is known to use brake conditioning mechanism including a float for conditioning the brake for the higher braking effort when the liquid in the tank rises above a given level. Such mechanism may be very simple and reliable, but in cases where at different occasions the liquid load can be constituted of liquids having different specific gravities, the given level may correspond to widely varying weights of the tank contents so that the shifting from the one braking effort condition to the other will be effected at vehicle loads that depart considerably from the intended ones.

An object of the present invention is therefore to provide float-operated brake conditioning mechanism, which ensures that the shifting between the lower and the higher braking effort condition will always be effected at the same predetermined weight of the tank contents, i. e. at a certain vehicle load, independently of the variable specific gravity of the load liquid.

Another object of the invention is to provide float-operated automatic mechanism of the kind referred to, the float of which is of vertically elongated shape which will ensure rising of the float at a lower level for a heavier liquid and at a higher level for a lighter liquid, whereby the difference between the specific gravities of the liquids will be compensated. For this purpose the float included in the mechanism extends with its lower end downwardly into immediate proximity of the bottom of the tank, while the other end of the float reaches at least up to the level that the lightest liquid in question must reach in order that the amount of liquid contained in the tank may constitute the predetermined vehicle load, at which the shifting to the higher braking effort condition is to be effected.

Further objects and advantages of the invention will appear from the following specification, reference being had to the accompanying drawing, in which Fig. 1 is a side view of a tank wagon, partly in section.

Fig. 2 is a section of the tank wagon on line II—II in Fig. 1.

Fig. 3 is a section on a larger scale of a valve mechanism to be operated by means of the float.

Fig. 4 is a view of a portion of the top part of the tank, showing a modified manner of mounting the valve mechanism.

Referring to the drawing, the float 1 may preferably have the form of an air-filled cylinder with thin walls. It is vertically mounted in the tank 11 and connected with a spindle 2 which is axially displaceably guided in a sleeve 3 mounted in the roof of the tank 11. A spring 4 which is arranged in the said sleeve 3 exerts a lifting action on the spindle 2 and thereby compensates wholly or partly the weight of the latter and of the float. The float 1 has its lower end axially displaceably guided in a bearing 5 secured to the bottom of the tank 11. Situated above the top end of the spindle 2 is a spring 6 urging the spindle downwardly with a determined force. If the spindle moves upwards overcoming this force, it abuts against the stem 12 of a valve 7 which when opened brings two compressed-air conduits 8 and 9 into communication. To facilitate mounting it may be suitable to mount the valve 7 elsewhere than on top of the sleeve 3, and in such a case a lever 10 may form the connection between the spindle 2 and the valve 7.

The function of the described device is as follows. When the vehicle is empty, the float 1 and the spindle 2 are in the lowermost position and the valve 7 is closed. When liquid is supplied to the tank 11 and begins to rise along the float body, a lifting force will act upon the float, said force being the greater, the higher specific gravity the liquid has. When the lifting force is great enough to overcome the determined force of the spring 6, the float moves upwards and opens the valve 7 so that the conduits 8 and 9 are brought into communication. The conduit 8 is connected with a source of compressed-air, e. g. with the vehicle control valve for the compressed-air brake, while the conduit 9 is connected with the means for shifting the brake into the higher braking effort condition which may be obtained in any known manner, for instance by throwing in an additional brake cylinder or a higher brake applying leverage of the brake rigging.

Thus, if the valve 7 is open, the brake will act on braking with the higher braking effort desirable at vehicle loads above the predetermined value, and when the valve 7 is closed, the brake will act with the lower braking effort corresponding to an empty vehicle or a vehicle having a small load.

What I claim and desire to secure by Letters Patent is:

1. An automatic brake conditioning mechanism in vehicles with a tank for liquid load, comprising control means operable for varying the braking power of the brake according to the load and means comprising a vertically movable float in the tank for operating said control means, the bottom of said float being slidably mounted in proximity to the bottom of said tank, said float extending vertically upward from said bottom at least up to a level at which even the specifically lightest liquid with which the tank is adapted to be filled constitutes the load corresponding to the maximum braking power of the brake.

2. An automatic brake conditioning mechanism as claimed in claim 1, and including vertically aligned guides in the tank at the bottom and top thereof, said float consisting of a relatively narrow and elongated vertically disposed body having at its upper and lower ends axially projecting extension rods coacting with said guides for guiding said float in its vertical movements, and spring means pressing on the upper said rod normally maintaining said float in its lowermost position.

3. An automatic brake conditioning mechanism as claimed in claim 2, said axially projecting extension rod at the upper end of said body extending to the top of said tank, a valve mechanism on the top of said tank operatively connected to said extension rod, said valve mechanism upon being operated by upward movement of said float and said extension rod against the action of said spring means actuating the control means for the conditioning of the brake dependent on the weight of liquid in said tank.

References Cited in the file of this patent

UNITED STATES PATENTS

| | | |
|---|---|---|
| 1,602,108 | Haskell | Oct. 5, 1926 |
| 2,088,185 | Borde | July 27, 1937 |
| 2,178,927 | Campbell | Nov. 7, 1939 |
| 2,224,345 | Heathman et al. | Dec. 10, 1940 |